United States Patent
Eckel et al.

(10) Patent No.: US 9,341,775 B1
(45) Date of Patent: May 17, 2016

(54) THERMOPLASTIC REINFORCED MICRO-TRUSS MATERIALS

(71) Applicant: HRL LABORATORIES, LLC, Malibu, CA (US)

(72) Inventors: Zak Eckel, Calabasas, CA (US); Alan J. Jacobsen, Woodland Hills, CA (US); Andrew P. Nowak, Los Angeles, CA (US); Sophia S. Yang, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 2 days.

(21) Appl. No.: 14/197,038

(22) Filed: Mar. 4, 2014

Related U.S. Application Data

(60) Provisional application No. 61/778,242, filed on Mar. 12, 2013.

(51) Int. Cl.
*G02B 6/122* (2006.01)
*B29D 11/00* (2006.01)

(52) U.S. Cl.
CPC ........ *G02B 6/1221* (2013.01); *B29D 11/00673* (2013.01); *Y10T 428/249955* (2015.04); *Y10T 428/249958* (2015.04); *Y10T 428/249987* (2015.04)

(58) Field of Classification Search
CPC ........... Y10T 428/249987; Y10T 428/249992; G02B 6/12002; G02B 6/138; B05D 1/18; B05D 5/00; B05D 2201/02
See application file for complete search history.

(56) References Cited

U.S. PATENT DOCUMENTS

| | | | |
|---|---|---|---|
| 3,468,771 | A | 9/1969 | Pedlow |
| 3,816,233 | A | 6/1974 | Powers |
| 4,116,893 | A | 9/1978 | Flanagan |
| 4,183,996 | A | 1/1980 | Kremer et al. |
| 4,216,177 | A | 8/1980 | Otto |
| 5,039,567 | A | 8/1991 | Landi et al. |

(Continued)

OTHER PUBLICATIONS

Klempner et al., "Interpenetrating Polymer Networks," Advances in Chemistry Series, vol. 239, American Chemical Society, 40 pages, (1994).

(Continued)

*Primary Examiner* — Hai Vo
(74) *Attorney, Agent, or Firm* — Lewis Roca Rothgerber Christie LLP

(57) ABSTRACT

A micro-truss fabricated of thermosetting polymer and toughened with a coating of thermoplastic polymer. In one embodiment the thermosetting polymer micro-truss is immersed in a solution of thermoplastic polymer in an organic solvent. The immersion causes the micro-truss to absorb the thermoplastic polymer solution and to become coated with the thermoplastic polymer solution. Subsequent drying of the micro-truss leaves a coating of thermoplastic polymer on the micro-truss, and a layer of thermosetting polymer into which the thermoplastic polymer has penetrated. In another embodiment a thermoplastic monomer solution is allowed to diffuse into, and coat, the thermosetting polymer micro-truss, and the thermoplastic monomer is subsequently polymerized.

23 Claims, 6 Drawing Sheets

(56) References Cited

U.S. PATENT DOCUMENTS

| | | | |
|---|---|---|---|
| 5,180,619 A | 1/1993 | Landi et al. | |
| 5,554,673 A | 9/1996 | Shah | |
| 5,879,780 A | 3/1999 | Kindinger et al. | |
| 6,969,548 B1 | 11/2005 | Goldfine | |
| 7,382,959 B1 | 6/2008 | Jacobsen | |
| 8,017,193 B1 | 9/2011 | Zhou et al. | |
| 2005/0074593 A1* | 4/2005 | Day et al. | 428/292.1 |
| 2011/0244213 A1* | 10/2011 | Jones | 428/304.4 |
| 2013/0273347 A1 | 10/2013 | Jacobsen et al. | |

OTHER PUBLICATIONS

Ali et al., "Thermoplastic Interpenetrating Polymer Networks," Advance in Interpenetrating Polymer Networks, vol. 4, pp. 17-43, (1994).

Lipatov et al., "Gradient Interpenetrating Polymer Networks," Advance in Interpenetrating Polymer Networks, vol. 4, pp. 191-212, (1994).

U.S. Appl. No. 13/624,932, filed Sep. 23, 2012, entitled: "Unsaturated Monomeric Formulations for the Fabrication of Polymeric Waveguides," 42 pages.

* cited by examiner

THERMOPLASTIC REINFORCED MICRO-TRUSS MATERIALS

CROSS-REFERENCE TO RELATED APPLICATION(S)

This application claims the benefit of Provisional Application No. 61/778,242, filed Mar. 12, 2013, entitled "THERMOPLASTIC REINFORCED MICRO-TRUSS MATERIALS", the entire content of which is incorporated herein by reference. This application incorporates by reference in its entirety, as if set forth in full, U.S. Pat. No. 7,382,959 ("the '959 Patent"), entitled "OPTICALLY ORIENTED THREE-DIMENSIONAL POLYMER MICROSTRUCTURES" and U.S. Pat. No. 8,017,193 ("the '193 Patent") entitled "MONOMERIC FORMULATION FOR MAKING POLYMER WAVEGUIDES".

FIELD

The following description relates to micro-truss structures and more particularly to thermoset micro-truss structures toughened with a thermoplastic polymer.

BACKGROUND

Polymer cellular materials or three-dimensional (3D) microstructures, having the shape of a three-dimensional micro-truss, which may also be referred to as a micro-lattice or microlattice, have numerous applications, including applications as mechanical structures for support, cushioning, and shock-absorption, as heat or mass exchangers or components thereof, and as flow-regulating devices or materials.

As formed, for example, in the process described in the '959 Patent, these structures are composed of thermosetting polymers, which have high temperature stability but lack the toughness of certain other materials. In some applications, such as in padding materials, greater toughness is desired. Thus, there is a need for a system and method for forming polymer cellular materials with enhanced toughness.

SUMMARY

In one embodiment the thermosetting polymer micro-truss is immersed in a solution of thermoplastic polymer in an organic solvent. The immersion causes the micro-truss to absorb the thermoplastic polymer solution and to become coated with the thermoplastic polymer solution. Subsequent drying of the structure leaves a coating of thermoplastic polymer on the micro-truss, and a layer of thermosetting polymer into which the thermoplastic polymer has penetrated. In another embodiment a thermoplastic monomer solution is allowed to diffuse into, and coat, the thermosetting polymer micro-truss, and the thermoplastic monomer is subsequently polymerized.

According to an embodiment of the present invention there is provided a toughened polymer micro-truss, including a regular plurality of truss elements, each of the plurality of truss elements including a thermoset polymer and a thermoplastic polymer, and each of the plurality of truss elements including a coating of the thermoplastic polymer, the ratio of the diameter of the truss element to the thickness of the coating being greater than 0.5 and less than 2000.

In one embodiment, the diameter of each of the plurality of truss elements is greater than 10 microns and less than 10 millimeters.

In one embodiment, all of the truss elements of the plurality of truss elements have substantially the same proportion of thermoset polymer and thermoplastic polymer.

In one embodiment, all of the truss elements of the plurality of truss elements have substantially the same diameter.

In one embodiment, the ratio of the diameter of the truss element to the thickness of the coating is less than 2000.

In one embodiment, the coating includes stabilizing additives. TPU (and micro-truss) can be susceptible to UV degradation. Pigments, such as carbon black (Cabot REGAL™ 660R) or TiO2, or UV absorbers, such as the chemical additives ethanediamide, N-(2-ethoxyphenyl)-N'-(2-ethylphenyl), which may be referred to as TINUVIN™ 312, or phenol, 2-(2H-benzotriazol-2-yl)-4,6-bis(1-methyl-1-phenylethyl), which may be referred to as TINUVIN™ 234, may, for example, be used for this purpose.

In one embodiment, the thermoset polymer includes, as a major component, a material selected from the group consisting of thiolene polymers, acrylate polymers, other ultraviolet light cured polymers, and combinations thereof.

In one embodiment, the thermoplastic polymer includes, as a major component, a material selected from the group consisting of thermoplastic polyurethane (TPU), polystyrene, other thermoplastics soluble in an organic solvent, and combinations thereof.

In one embodiment, the plurality of truss elements includes: a plurality of first truss elements defined by a plurality of first self-propagating polymer waveguides and extending along a first direction; a plurality of second truss elements defined by a plurality of second self-propagating polymer waveguides and extending along a second direction; and a plurality of third truss elements defined by a plurality of third self-propagating polymer waveguides and extending along a third direction.

In one embodiment, the separation between two of the plurality of first truss elements is less than 20 times the diameter of a truss element of the plurality of first truss elements.

In one embodiment, the diameter of a truss element is less than 10 millimeters.

According to an embodiment of the present invention there is provided a method of forming a toughened polymer regular micro-truss. The method includes: forming a micro-truss of thermoset polymer; forming a first solution of a thermoplastic polymer in a first solvent; immersing the micro-truss in the first solution for a period of time to form a dipped micro-truss; removing the dipped micro-truss from the first solution; and drying the dipped micro-truss.

In one embodiment, the thermoset polymer includes, as a major component, a material selected from the group consisting of thiolene polymers, acrylate polymers, other ultraviolet light cured polymers and combinations thereof.

In one embodiment, the thermoplastic polymer includes, as a major component, a material selected from the group consisting of thermoplastic polyurethane (TPU), polystyrene, other thermoplastics soluble in organic solvent, and combinations thereof.

In one embodiment, the first solvent includes, as a major component, a material selected from the group consisting of dimethylformamide (DMF), dimethylsulfoxide (DMSO), tetrahydrofuran (THF), butanone, toluene, and combinations and blends thereof.

In one embodiment, the period of time is sufficiently long to allow the thermoplastic polymer to diffuse substantially into the micro-truss.

In one embodiment, the period of time is greater than 15 minutes.

In one embodiment, the period of time is sufficiently short to prevent the thermoplastic polymer from diffusing substantially into the micro-truss.

In one embodiment, the period of time is less than 30 seconds.

In one embodiment, the thermoplastic polymer is selected to have a glass transition temperature differing substantially from the glass transition temperature of the thermoset polymer.

In one embodiment, the difference between the glass transition temperature of the thermoset polymer and the glass transition temperature of the thermoplastic polymer is 10° C.

In one embodiment, the difference between the glass transition temperature of the thermoset polymer and the glass transition temperature of the thermoplastic polymer is 20° C.

In one embodiment, the difference between the glass transition temperature of the thermoset polymer and the glass transition temperature of the thermoplastic polymer is 50° C.

In one embodiment, the thermoplastic polymer is selected to have a glass transition temperature substantially the same as the glass transition temperature of the thermoset polymer.

In one embodiment, the drying of the dipped micro-truss includes removing solvent from the dipped micro-truss with a stream of air from an air knife or from a nozzle.

In one embodiment, the stream of air is incident on a surface of the micro-truss.

In one embodiment, the stream of air removes more than one half of the thickness of a layer of the first solution from the micro-truss.

In one embodiment, the stream of air enters a first surface of the micro-truss and exits a second surface of the micro-truss.

In one embodiment, the forming of the micro-truss includes: forming a plurality of first truss elements defined by a plurality of first self-propagating polymer waveguides and extending along a first direction; forming a plurality of second truss elements defined by a plurality of second self-propagating polymer waveguides and extending along a second direction; and forming a plurality of third truss elements defined by a plurality of third self-propagating polymer waveguides and extending along a third direction.

In one embodiment, the method includes post curing the toughened polymer micro-truss.

In one embodiment, the post curing of the toughened polymer micro-truss includes heating the toughened polymer micro-truss in a nitrogen atmosphere to a temperature lower than 160° C. for at least 12 hours.

In one embodiment, the method includes: immersing the dipped micro-truss in a second solution to form a re-dipped micro-truss; and drying the re-dipped micro-truss.

In one embodiment, the method includes removing a solvent from the dipped micro-truss using liquid-liquid extraction.

In one embodiment, the removing of the solvent from the dipped micro-truss using liquid-liquid extraction includes soaking the dipped micro-truss in a second solvent, wherein the second solvent is selected to dissolve the first solvent and to not dissolve the thermoplastic polymer.

In one embodiment, the proportion of thermoplastic polymer in the thermoplastic polymer solution is between 5% by weight and 20% by weight.

BRIEF DESCRIPTION OF THE DRAWINGS

These and other features and advantages of the present invention will become appreciated as the same become better understood with reference to the specification, claims and appended drawings wherein:

DETAILED DESCRIPTION

The detailed description set forth below in connection with the appended drawings is intended as a description of exemplary embodiments of thermoplastic reinforced micro-truss materials provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features. As used herein, the term "substantially" is used as a term of approximation and not a term of degree, and is intended to account for the inherent deviations in measured or calculated values or the inherent variations in characteristics of a fabricated product that would be recognized by those of ordinary skill in the art.

Figure 1:
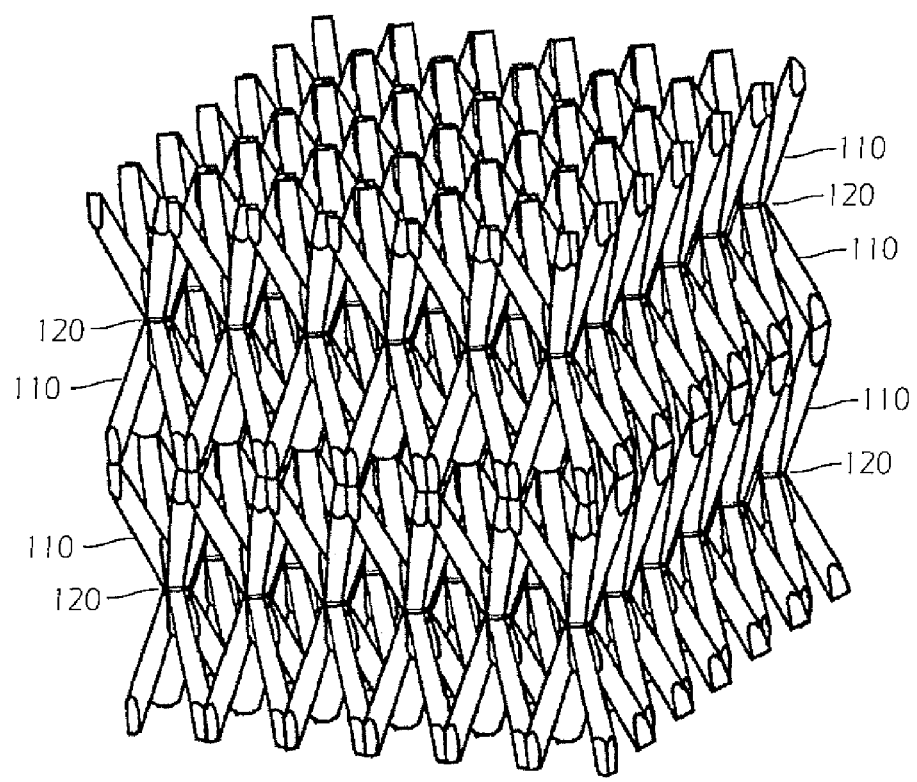
FIG. 1 is a perspective view of a thermoplastic reinforced micro-truss material according to an embodiment of the present invention.

Referring to FIG. 1, according to an embodiment of the present invention, a quantity of a thermoplastic reinforced micro-truss material, which may be referred to as a toughened micro-truss material, may include a plurality of truss elements 110 intersecting at nodes 120. The structure may be regular, i.e., substantially periodic. In a first act of an exemplary process for forming such a toughened micro-truss material, a thermosetting polymer micro-truss, may be formed as follows. A suitable photopolymerizable resin may be poured into a tray and covered with a mask having an array of holes. The tray may be irradiated, through the mask, with collimated light. The collimated light entering the mask from a given direction through a given hole in the mask takes the shape of a beam of light in the resin, causing one or more chemical changes in the resin within the beam. These chemical changes may affect the index of refraction, and as a result the beam may cause a waveguide to form in the resin, which then in turn guides the beam along the path where the waveguide has already formed, thereby acting as a self-propagating waveguide. In particular, in one embodiment of the present invention, the collimated light may cause the resin to polymerize, forming a thermosetting polymer, which may also be referred to as a thermoset. The polymer waveguides formed by exposure to beams from different directions may intersect, e.g., interpenetrate, resulting in a three-dimensional interconnected pattern, or three dimensional micro-truss, composed of truss elements 110 defined by self-propagating waveguides, which intersect at nodes 120. In one embodiment, collimated light from at least three different directions is used, and the directions may be oblique, i.e., non-perpendicular, to each other. The unreacted resin may then be washed away, leaving a self-supporting micro-truss structure. An initial post-cure may be performed at this point in the process, e.g., by heating the micro-truss structure, or by exposing the micro-truss structure to UV light, to complete the curing of any part of the structure which may have been incompletely cured during the process of forming the micro-truss structure. The assembly of truss elements 110 intersecting at nodes 120 illustrated in FIG. 1 may be a portion of a sheet, having a length and a width substantially greater than its thickness.

Figure 2:
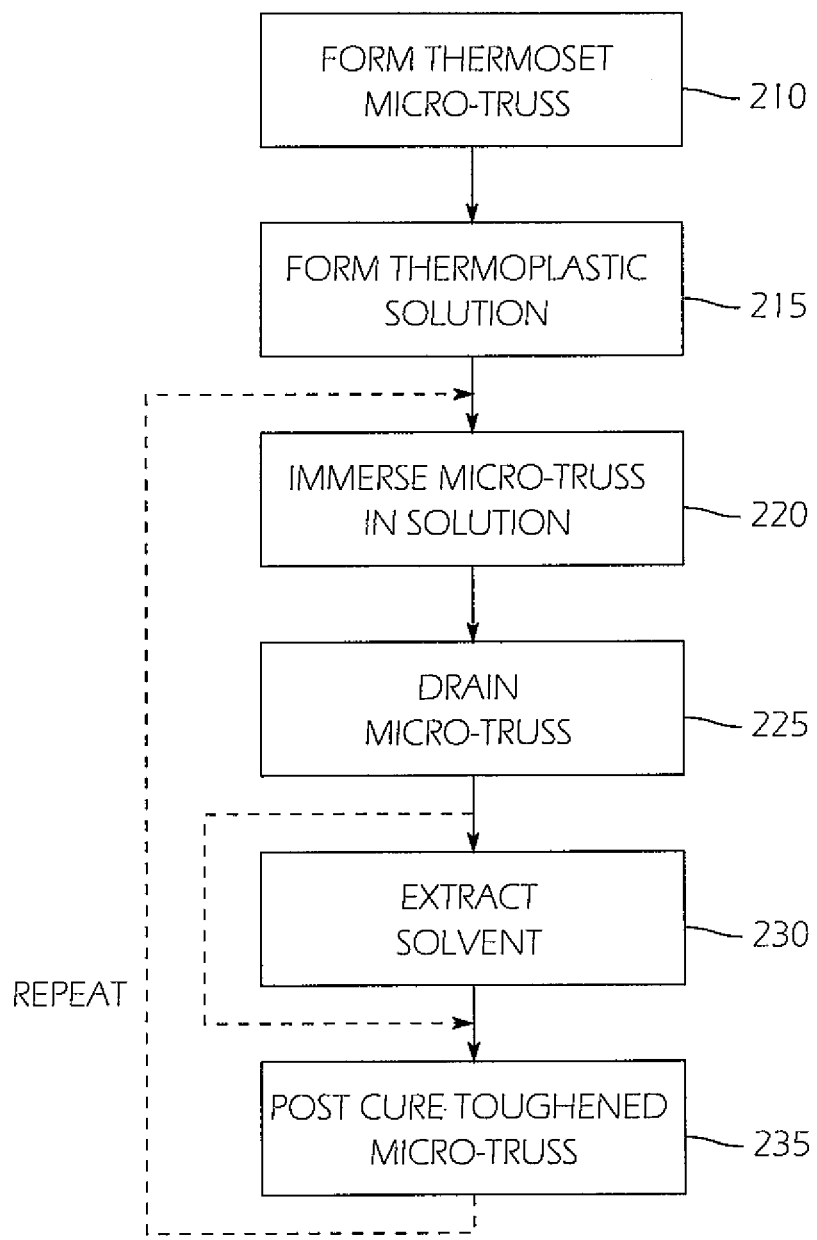
FIG. 2 is a flow chart illustrating acts performed in fabricating a thermoplastic reinforced micro-truss material according to an embodiment of the present invention.

Referring to FIG. 2, after the initial act 210 of forming a thermoset micro-truss, the thermosetting polymer micro-truss may be toughened according to embodiments of the present invention, by applying to the surfaces of the truss elements 110 and nodes 120 a thermoplastic polymer coating, which may also penetrate to some extent into the truss elements 110 and nodes 120. In a first act 215 of the toughening process, a solution of thermoplastic in a suitable organic solvent is formed. Next, in an act 220, the thermoset micro-truss is immersed in the solution. Next, in an act 225, the micro-truss is removed from the solution and drained, then, in an optional act 230, excess solvent is removed by liquid-liquid extraction, and finally, in an act 235, the micro-truss is post cured, by heating it to an elevated temperature for a period of time. The post-curing process may cross-link the thermoset of the micro-truss, which was already cured to a certain extent by the UV exposure used to form it, around the thermoplastic. Heat treating or UV exposure may be used for the post cure. The act of draining the micro-truss may optionally be accelerated or assisted by the use of an air knife or similar technique.

In act 215, a suitable thermoplastic polymer is dissolved in an organic solvent. The thermoplastic polymer is one that is capable of being dissolved in the organic solvent, and provides the desired toughening capabilities, retaining these capabilities after the coating process. In one embodiment, a thermoplastic polyurethane (TPU) is used as, or is a major component of, the thermoplastic polymer. As used herein, the term "major component" means a component constituting at least half, by weight, of a composition. The organic solvent may be dimethylformamide (DMF), dimethylsulfoxide (DMSO), tetrahydrofuran (THF), or a solvent blend such as a blend of THF, butanone, and toluene. It may be advantageous to use a solvent capable of swelling the thermoset micro-truss, but not capable of dissolving or otherwise damaging it. The thermoplastic polymer may be mixed in a desired proportion with the solvent and given the necessary agitation and time to fully dissolve, creating a well-mixed solution of thermoplastic polymer. The solution may initially be made at saturation concentration, and then diluted to the desired concentration at time of use.

In a subsequent act 220, the micro-truss may be immersed in the solution and loaded with thermoplastic polymer. This may be accomplished by providing a solvent-resistant container, e.g., a stainless steel container, which is sufficiently large to accommodate the micro-truss, which may swell during the immersion. To support the micro-truss during immersion and draining, a solvent resistant polymer mesh, net, or a rigid net or mesh of metal may be used. In one embodiment, the micro-truss is left in the solution for an extended soaking time, and the micro-truss swells as it absorbs the solution. During this time the solution may penetrate into the thermoset matrix, carrying with it the dissolved thermoplastic polymer. The amount of swelling may depend on the thermoset polymer, the cross-link density, the temperature, and the solvent used. In one embodiment, the micro-truss is left in the solution long enough for it to swell and for the polymer to diffuse into the micro-truss thermoset matrix. If the micro-truss is left partially uncured, e.g., by using a shortened or reduced-temperature post-curing process, additional swelling may be achieved and possible higher thermoplastic polymer loading may occur. However, during this additional process the micro-truss may become fragile and more difficult to handle.

In one embodiment, a shorter immersion time may be used, to create a uniform coating of thermoplastic polymer on the surface of the micro-truss, without significant penetration of the thermoplastic polymer into the thermoset matrix of the micro-truss. The micro-truss is dipped in a thermoplastic polymer solution and allowed to fully submerge, so that surface contact of the micro-truss with the thermoplastic polymer solution is achieved. The wetting time is short enough, in this embodiment, that solvent is not able to penetrate the thermoset matrix of the micro-truss, but long enough to allow full surface contact. In one embodiment, the wetting time is less than one minute.

Once sufficient thermoplastic polymer loading has been achieved, the structure is, in an act 225, removed from the thermoplastic polymer solution and allowed to drain. The solvent resistant polymer mesh, net, or a rigid net or mesh of metal used to support the micro-truss during immersion may be used to support the micro-truss during draining and drying. The concentration of thermoplastic polymer in the thermoplastic polymer solution may be selected to allow sufficient surface build-up of thermoplastic polymer but low enough so the viscosity allows for drainage of excess. During the draining, a thin film of the thermoplastic polymer solution may form on the surface of the individual truss elements 110, creating a surface coating of the thermoplastic polymer.

After the micro-truss is immersed in the thermoplastic polymer solution and then removed, excess thermoplastic polymer solution may cling to the micro-truss and block the channels in its 3D architecture, i.e., the channels between the truss elements 110. The excess thermoplastic polymer solution may be removed through gravity draining or more efficiently by directing a stream of a high pressure gas, such as air, through the micro-truss with a device like an air knife or nozzle. After allowing the bulk of the thermoplastic polymer solution to drain from the micro-truss, the micro-truss may be positioned so that the excess can drain effectively, either by hanging the micro-truss or by placing it on an open surface such as a rigid mesh or grate. The excess thermoplastic polymer solution may then be blown from the surface and channels of the micro-truss, leaving a thin film of thermoplastic polymer solution on the surface of the micro-truss truss elements 110 and nodes 120. When a thermoplastic polymer solution based on a solvent with a low boiling point, such as THF, which has a boiling point of 66° C., is used, the solvent will begin to evaporate during the process of draining of the micro-truss, or of assisted draining, e.g., using an air knife, and it may be advantageous to complete this process quickly to prevent excessive buildup of the thermoplastic polymer.

After the act 225 of draining the micro-truss, it may be advantageous to extract excess solvent from the micro-truss in an optional solvent-extraction act 230 which may involve using liquid-liquid extraction. In this act the micro-truss may be soaked in an additional solvent, such as water or isopropyl alcohol, which can dissolve the original solvent but not the thermoplastic polymer. This additional solvent may then draw the thermoplastic solvent (i.e., the organic solvent used to dissolve the thermoplastic polymer in act 215) from the thin film of thermoplastic polymer solution and from the thermoset matrix of the micro-truss, leaving the thermoplastic polymer embedded in the micro-truss thermoset matrix or in a thin film on its surface. This act 230 may be especially helpful when a thermoplastic polymer solution using a solvent with a high boiling point, such as DMF, which has a boiling point of 153° C., in which case the surface of the micro-truss maybe may cleaned efficiently, but the thermoplastic solvent may need to be extracted from the thermoplastic polymer film and micro-truss thermoset matrix.

After the act 225 of draining the micro-truss, and after the optional solvent-extraction act 230, if the act 230 is employed, the micro-truss may be post-cured, in an act 235, for example by heating it to 160° C. for 12 hours in an atmosphere of an inert gas such as nitrogen. Excess solvent may be removed, especially if it is a solvent with a low boiling point, during the act 235 of post-curing of the polymer.

If additional strength is required, additional coats may optionally be applied sequentially to the micro-truss after the initial acts of immersion 220, draining 225, optional solvent extraction 230, and post-curing 235, as indicated by the dashed line labeled "REPEAT" in FIG. 2. The act 235 of post-curing may involve a shorter post-curing time on all but the final repetition, e.g., a time just sufficient to allow the solvent to evaporate.

Figure 3:
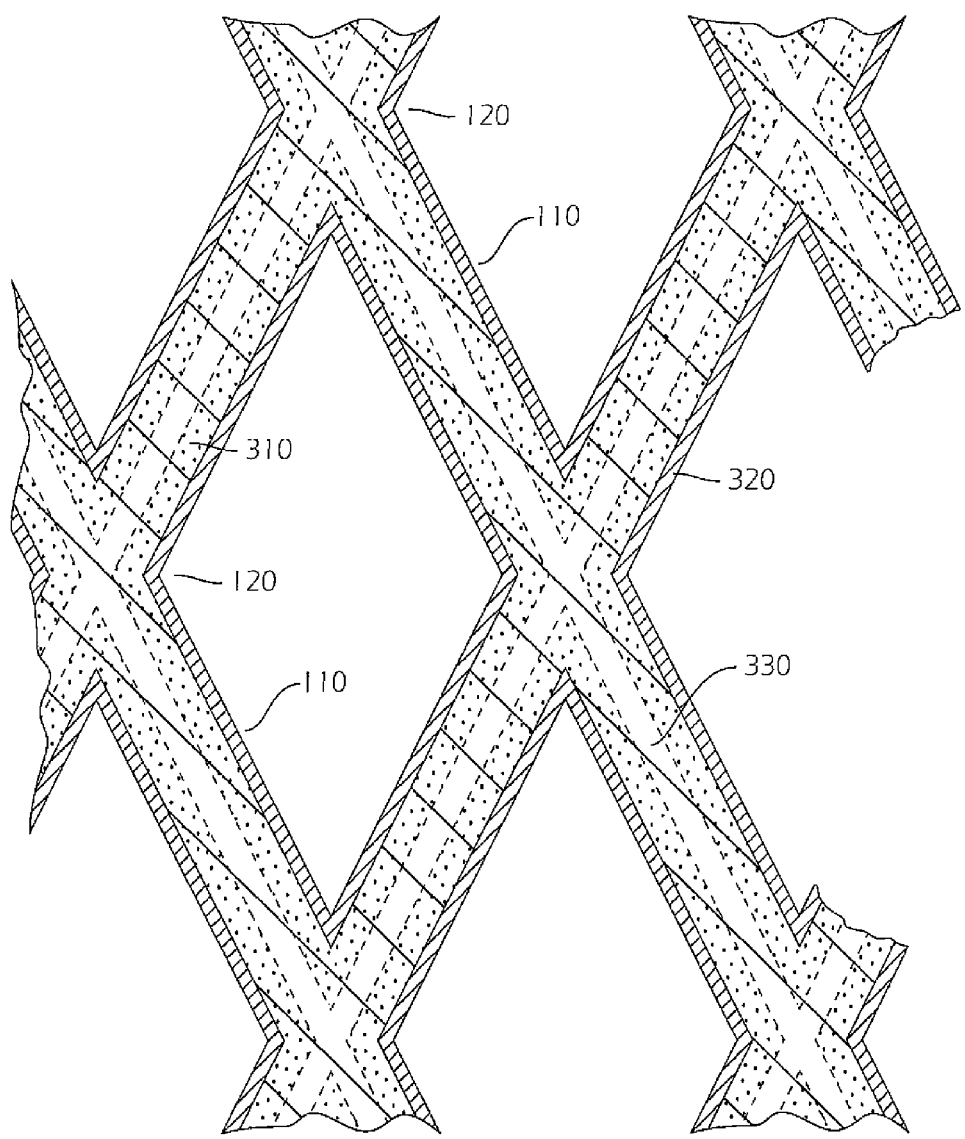
FIG. 3 is a breakaway cross-sectional view of a thermoplastic reinforced micro-truss material according to an embodiment of the present invention.
Figure 4:
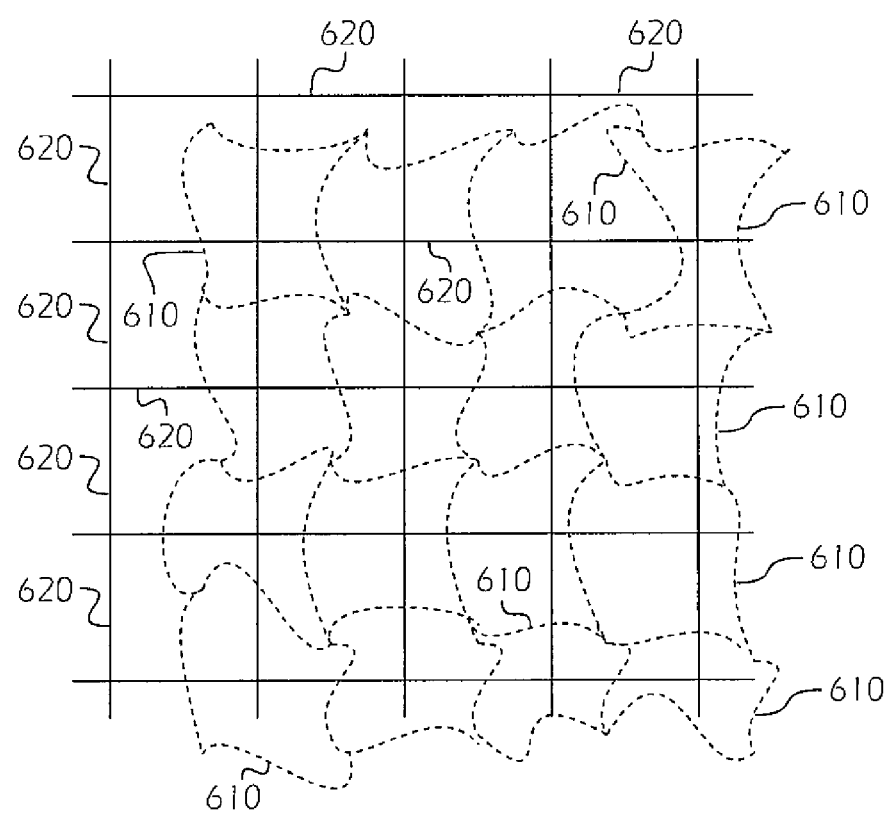
FIG. 4 is a schematic illustration of interlocking flexible and rigid polymer chains.

Referring to FIG. 3, truss elements 110 of the toughened micro-truss may be composed of several layers. An outer thermoplastic polymer layer 320 may coat each truss element 110 and node 120. The swelling of the micro-truss in the thermoplastic polymer solution may have resulted in the diffusion of the thermoplastic polymer into the thermoset matrix, creating a semi interpenetrating polymer network (sIPN) layer 310. An sIPN layer 310 may be defined as a polymer "composition(s) in which one or more polymers are cross-linked and one or more polymers are linear or branched," and an IPN may be defined as "a combination of two or more polymers in network form that are synthesized in juxtaposition." The act 235 of post-curing may complete the cross-linking of the thermoset matrix of the micro-truss with the thermoplastic polymer which strengthens the sIPN cross-linking. FIG. 4 illustrates the interlocking structure that may result when flexible polymer chains 610 and rigid polymer chains 620 are synthesized in juxtaposition. In some embodiments the flexible polymer chains are not cross-linked but woven through the cross-linked network/mesh.

Continuing with FIG. 3, the central core 330 of the truss elements 110 and nodes 120 may comprise thermoset. The outer thermoplastic polymer layer 320 or the sIPN layer 310 may be thicker or thinner, or may be substantially or entirely absent, depending on a number of factors including the materials used, the concentration of the thermoplastic polymer solution, the length of the immersion 220, and the process used in act 225 for draining. In one embodiment, the outer thermoplastic polymer layer 320 is composed of only thermoplastic, and the sIPN layer 310 is composed of both thermoset and thermoplastic, which may be cross-linked together. Here, in one embodiment, a concentration gradient of thermoplastic and thermoset is formed in the sIPN layer 310 where the concentration of thermoplastic is higher, and the concentration of thermoset is lower, in the sIPN layer near its boundary with the outer thermoplastic polymer layer 320, and the concentration of thermoplastic is lower, and the concentration of thermoset is higher, in the sIPN layer 310 near its boundary with the central core 330.

Figure 5:
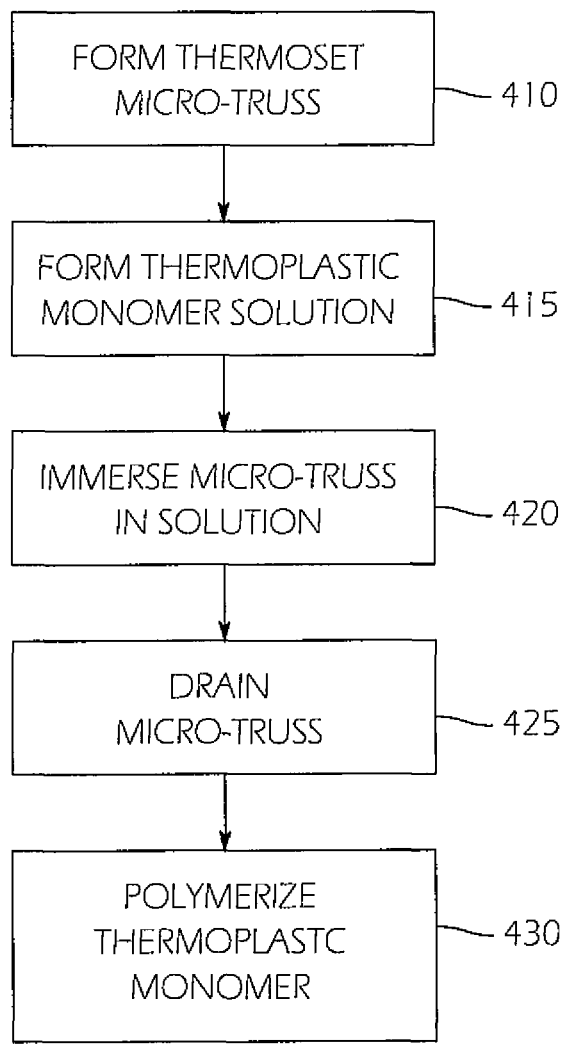
FIG. 5 is a flow chart illustrating acts performed in fabricating a thermoplastic reinforced micro-truss material according to another embodiment of the present invention.

Referring to FIG. 5, in another embodiment, a similar toughened micro-truss is formed using a different method. In a first act 410, a thermoset micro-truss is formed. A thermoplastic monomer solution, containing a thermoplastic monomer, and additives to trigger and control polymerization of the monomer, is then formed in an act 415. The micro-truss is immersed in the thermoplastic monomer solution in an act 420, and drained and dried in an act 425. As in the act 225, the act 425 may include drying the micro-truss by directing a stream of a high pressure gas, such as air, through the micro-truss with a device like an air knife or nozzle. In a final act 430, the thermoplastic monomer may be caused to polymerize in a post-curing step using heat, ultraviolet, or moisture. The method of this embodiment may also result in an sIPN layer 310 and an outer thermoplastic polymer layer 320, and the thickness or presence of each layer may be controlled by process parameters including the duration of the act of immersion 420, and the process used to drain the micro-truss in the act 425.

By incorporating a tough thermoplastic material into a previously formed thermosetting polymer micro-truss, the overall toughness of the porous micro-truss material may significantly increase, all while maintaining the ordered micro-truss architecture. Here, toughness may mean resistance to damage as a result of externally applied forces. The ordered micro-truss architecture also ensures uniform loading of the thermoplastic material throughout the micro-truss network, and helping to avoid the premature failure which may result from a non-uniform loading (concentration) of thermoplastic toughening polymer throughout the micro-truss. The polymer blend (thermoset and thermoplastic) gradient provide a gradual transition to avoid a sharp contrast in material properties, promote adhesion, and more uniformly carry a mechanical load through the individual truss elements 110.

Another advantage of having the thermoplastic polymer combined with the thermoset polymer in the micro-truss configuration is that the thermoplastic can be selected such that it has a glass transition temperature (Tg) that is similar or significantly different that of the thermosetting polymer. This provides another design parameter (Tg) which may be adjusted to influence the physical properties of the toughened micro-truss as a function of temperature.

The following example illustrates embodiments or the present invention in more detail. This example, however, should not be interpreted as limiting the scope of the present invention.

EXAMPLE

A micro-truss sample was made using the method described in the '959 Patent. The architecture consisted of struts with a diameter of 400 microns and a diagonal spacing between nodes 120 of 4 mm. The bulk dimensions of the micro-truss were 4.25 inches×4.25 inches×0.6 inches. The micro-truss polymer composition consisted of a thiolene chemistry. A thermoplastic polyurethane, LUBRIZOL™ ESTANE™ Thermoplastic Polyurethane 5707 (TPU) was used as the thermoplastic polymer. In a 2 liter brown glass jar, with a TEFLON™ gasket lid, TPU was added to THF to obtain a concentration of 10% by weight, i.e., the mass of the TPU used was 10% of the mass of the solution formed. The jar was sealed and mixed on a roller mixer for 12 hours to dissolve the TPU completely.

The TPU thermoplastic polymer solution was then poured into a 9 inch×12 inch×2.5 inch stainless steel tray to a depth of approximately 1 inch. The micro-truss was placed on a rigid polymer mesh. The mesh was used to support the micro-truss during draining and to make it easier to remove the micro-truss from the TPU thermoplastic polymer solution. The mesh was cut and bent in a way that a portion of either end of the mesh extended above the solvent line for extraction. On the mesh, the micro-truss was transferred to the thermoplastic polymer solution bath. With stainless steel spatulas the micro-truss was guided to the center of the tray and assisted as it was wetted in the solvent. Once the micro-truss was fully submerged, the tray was covered tightly with a stainless steel lid to prevent evaporation of the solvent. The micro-truss was left to soak for 30 minutes. It was then lifted from the solvent and allowed to drain over the bath until most of the solvent had drained. At this point the micro-truss had swelled from 4.25 inches×4.25 inches to approximately 5.5 inches×5.5 inches. The micro-truss on the mesh was transferred to a stainless steel grating on a stainless steel tray. Compressed air was blown at 40 psi over the micro-truss through a nozzle gun. The air was blown in sweeping patterns perpendicular to the micro-truss face and at angles in between to clear the pores. After about 30 to 60 seconds the micro-truss was flipped over onto a clean piece of mesh and put on the grate. Air was then blown through the micro-truss again to clean the channels. This was repeated two times to ensure that the structure was clean. The excess TPU thermoplastic polymer solution was collected in the steel tray under the micro-truss.

Figure 6:
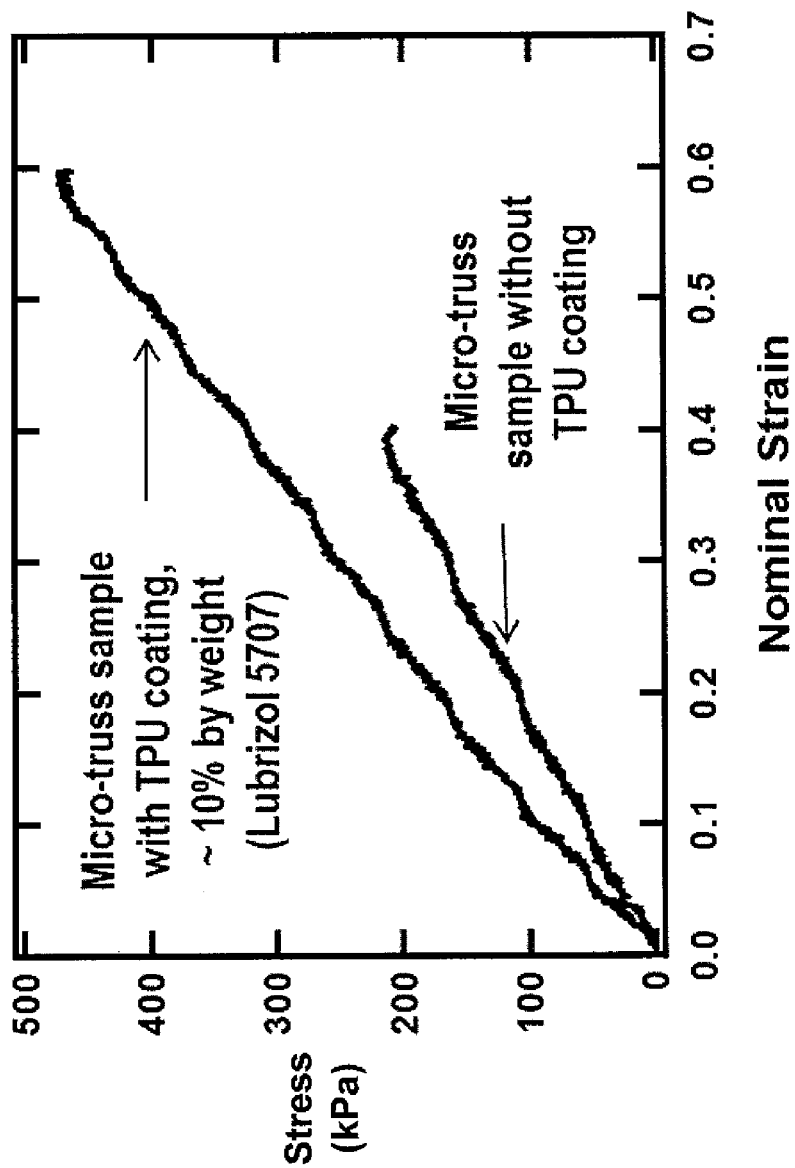
FIG. 6 is a graph of stress vs. strain for a sample of reinforced micro-truss material according to an embodiment of the present invention.

A 6 inch square piece of glass, $1/8^{th}$ inch thick, was then sprayed with lecithin mold release and the micro-truss was transferred to it. The mold release was used to prevent sticking to the glass during the curing step. The micro-truss was cured in a nitrogen atmosphere at 160° C. for 12 hours, and then allowed to cool. After curing the micro-truss had returned to its original size. Referring to FIG. 6, the stiffness of the toughened micro-truss significantly exceeds that of a sample of micro-truss which has not undergone the toughening process.

Although exemplary embodiments of thermoplastic reinforced micro-truss materials have been specifically described and illustrated herein, many modifications and variations will be apparent to those skilled in the art. Accordingly, it is to be understood that thermoplastic reinforced micro-truss materials constructed according to principles of this invention may be embodied other than as specifically described herein. The invention is also defined in the following claims, and equivalents thereof.

What is claimed is:

1. A toughened polymer micro-truss, comprising a regular plurality of truss elements,
    each of the plurality of truss elements comprising a thermoset polymer and a thermoplastic polymer, and
    each of the plurality of truss elements further comprising a coating of the thermoplastic polymer, the ratio of the diameter of the truss element to the thickness of the coating being greater than 0.5 and less than 2000,
    the micro-truss being a self-supporting structure,
    the plurality of truss elements comprising:
        a plurality of first truss elements defined by a plurality of first self-propagating polymer waveguides and extending along a first direction;
        a plurality of second truss elements defined by a plurality of second self-propagating polymer waveguides and extending along a second direction; and
        a plurality of third truss elements defined by a plurality of third self-propagating polymer waveguides and extending along a third direction,
    the plurality of first truss elements, the plurality of second truss elements, and the plurality of third truss elements interpenetrating at a plurality of nodes to form a continuous material,
    wherein the third direction is not in a plane defined by the first direction and the second direction.

2. The micro-truss of claim 1, wherein the coating comprises stabilizing additives.

3. The micro-truss of claim 1, wherein the thermoset polymer comprises, as a major component, a material selected from the group consisting of thiolene polymers, acrylate polymers, other ultraviolet light cured polymers, and combinations thereof.

4. The micro-truss of claim 3, wherein the truss elements of the plurality of truss elements intersect at plurality of nodes, and the separation between two of the plurality of nodes is less than 20 times the diameter of a truss element of the plurality of truss elements.

5. The micro-truss of claim 3, wherein the diameter of a truss element is less than 10 millimeters.

6. The micro-truss of claim 1, wherein the thermoplastic polymer comprises, as a major component, a material selected from the group consisting of thermoplastic polyurethane (TPU), polystyrene, other thermoplastics soluble in an organic solvent, and combinations thereof.

7. The micro-truss of claim 1, wherein each of the plurality of truss elements includes an interpenetrating network comprising the thermoset polymer and the thermoplastic polymer.

8. The micro-truss of claim 7, wherein the interpenetrating network is a semi interpenetrating polymer network.

9. The micro-truss of claim 1, wherein each of the plurality of truss elements includes a section composed of both thermoset and thermoplastic.

10. The micro-truss of claim 9, wherein at least a portion of the thermoset and thermoplastic is cross-linked together.

11. The micro-truss of claim 9, wherein the section composed of both thermoset and thermoplastic is adjacent to the coating, and the concentration of thermoplastic in the section near the boundary with the coating is higher than other portions of the section.

12. A method of forming a toughened polymer regular micro-truss, the method comprising:
    forming a micro-truss of thermoset polymer;
    forming a first solution of a thermoplastic polymer in a first solvent;
    immersing the micro-truss in the first solution for a period of time to form a dipped micro-truss;
    removing the dipped micro-truss from the first solution; and
    draining the dipped micro-truss to form a drained micro-truss, wherein:
        the drained micro-truss comprises a regular plurality of truss elements,
        each of the plurality of truss elements comprises a thermoset polymer and a thermoplastic polymer, and
        each of the plurality of truss elements further comprises a coating of the thermoplastic polymer, the ratio of the diameter of the truss element to the thickness of the coating being greater than 0.5 and less than 2000,
        the micro-truss is a self-supporting structure,
        the plurality of truss elements comprises:
            a plurality of first truss elements defined by a plurality of first self-propagating polymer waveguides and extending along a first direction;
            a plurality of second truss elements defined by a plurality of second self-propagating polymer waveguides and extending along a second direction; and
            a plurality of third truss elements defined by a plurality of third self-propagating polymer waveguides and extending along a third direction, the plurality of first truss elements, the plurality of second truss elements, and the plurality of third truss elements interpenetrates at a plurality of nodes to form a continuous material, and the third direction is not in a plane defined by the first direction and the second direction.

13. The method of claim 12, wherein the thermoset polymer comprises, as a major component, a material selected from the group consisting of thiolene polymers, acrylate polymers, other ultraviolet light cured polymers and combinations thereof.

14. The method of claim 12, wherein the thermoplastic polymer comprises, as a major component, a material selected from the group consisting of thermoplastic polyurethane (TPU), polystyrene, other thermoplastics soluble in organic solvent, and combinations thereof.

15. The method of claim 12, wherein the first solvent comprises, as a major component, a material selected from the group consisting of dimethylformamide (DMF), dimethylsulfoxide (DMSO), tetrahydrofuran (THF), butanone, toluene, and combinations and blends thereof.

16. The method of claim 12, wherein the period of time is sufficiently long to allow the thermoplastic polymer to diffuse substantially into the micro-truss, and wherein the period of time is greater than 15 minutes.

17. The method of claim 12, wherein the thermoplastic polymer is selected to have a glass transition temperature differing substantially from the glass transition temperature of the thermoset polymer.

18. The method of claim 12, wherein the thermoplastic polymer is selected to have a glass transition temperature substantially the same as the glass transition temperature of the thermoset polymer.

19. The method of claim 12, wherein the draining of the dipped micro-truss comprises removing solvent from the dipped micro-truss with a stream of air from an air knife or from a nozzle.

20. The method of claim 12, further comprising post curing the toughened polymer micro-truss, and wherein the post curing of the toughened polymer micro-truss comprises heating the toughened polymer micro-truss in a nitrogen atmosphere to a temperature lower than 160° C. for at least 12 hours.

21. The method of claim 12, further comprising:
immersing the dipped micro-truss in a second solution to form a re-dipped micro-truss; and
drying the re-dipped micro-truss.

22. The method of claim 12, further comprising removing the first solvent from the dipped micro-truss using liquid-liquid extraction, and the removing of the solvent from the dipped micro-truss using liquid-liquid extraction comprises soaking the dipped micro-truss in a second solvent, wherein the second solvent is selected to dissolve the first solvent and to not dissolve the thermoplastic polymer.

23. The method of claim 12, wherein the proportion of thermoplastic polymer in the first solution of the thermoplastic polymer is between 5% by weight and 20% by weight.

* * * * *